United States Patent
Poon

(10) Patent No.: US 8,231,716 B2
(45) Date of Patent: Jul. 31, 2012

(54) SELF-ALARMING AIR CLEANER

(76) Inventor: Chiwai Patrick Poon, Shenzhen (CN)

( * ) Notice: Subject to any disclaimer, the term of this patent is extended or adjusted under 35 U.S.C. 154(b) by 458 days.

(21) Appl. No.: 12/664,674

(22) PCT Filed: Jan. 31, 2008

(86) PCT No.: PCT/CN2008/000253
§ 371 (c)(1),
(2), (4) Date: Dec. 15, 2009

(87) PCT Pub. No.: WO2009/039713
PCT Pub. Date: Apr. 2, 2009

(65) Prior Publication Data
US 2010/0192772 A1 Aug. 5, 2010

(30) Foreign Application Priority Data
Sep. 25, 2007 (CN) .................. 2007 2 0057431 U

(51) Int. Cl.
*B03C 3/72* (2006.01)
(52) U.S. Cl. ............... 96/19; 95/3; 95/8; 95/25; 96/26; 96/418
(58) Field of Classification Search ............ 96/19, 26, 96/55, 57, 58, 397, 417–419, 63; 95/3, 8, 95/25, 63, 78; 55/DIG. 34
See application file for complete search history.

(56) References Cited

U.S. PATENT DOCUMENTS

| | | | | |
|---|---|---|---|---|
| 3,639,998 A * | 2/1972 | Mason | | 34/82 |
| 4,199,838 A * | 4/1980 | Simonsson | | 15/339 |
| 4,376,637 A * | 3/1983 | Yang | | 95/74 |
| 5,378,254 A * | 1/1995 | Maly et al. | | 96/418 |
| 5,668,535 A * | 9/1997 | Hendrix et al. | | 340/607 |
| 6,447,587 B1 * | 9/2002 | Pillion et al. | | 96/418 |
| 6,494,940 B1 | 12/2002 | Hak | | |
| 6,712,889 B2 * | 3/2004 | Pillion et al. | | 96/418 |
| 6,951,582 B1 * | 10/2005 | Tsai et al. | | 96/18 |
| 7,235,123 B1 * | 6/2007 | Biegelsen | | 96/26 |
| 7,806,961 B2 * | 10/2010 | Carlson et al. | | 95/25 |
| 2002/0152894 A1 * | 10/2002 | Pillion et al. | | 96/418 |
| 2004/0083895 A1 * | 5/2004 | Kim | | 96/414 |
| 2007/0039462 A1 * | 2/2007 | Helt et al. | | 95/6 |
| 2008/0134896 A1 * | 6/2008 | Holmes et al. | | 96/18 |
| 2010/0192772 A1 * | 8/2010 | Poon | | 96/26 |

FOREIGN PATENT DOCUMENTS

| | | |
|---|---|---|
| CN | 2452595 Y | 10/2001 |
| CN | 2499739 Y | 7/2002 |
| CN | 2630704 Y | 8/2004 |
| CN | 101004544 A | 7/2007 |
| JP | 63-178814 A | 7/1988 |

* cited by examiner

*Primary Examiner* — Richard L Chiesa
(74) *Attorney, Agent, or Firm* — Frank Marino

(57) ABSTRACT

A self-alarming air cleaner is disclosed. The air cleaner includes an air filter element (1), a light emitting element (2) and a light sensor (3). The light emitting element (2) and the light sensor (3) are both faced to the air filter element (1). The light emitted from the light emitting element (2) is reflected by the air filter element (1) or permeated to the air filter element (1), then forms an area of light attenuation where the light sensor (3) is located. The light emitting element (2) and the light sensor (3) connect with a circuit which has an alarming device. When much dust is accumulated on the air filter element (1), the intensity of the light reaching the light sensor (3) is weakened and the alarming device (4) can give an alarm automatically.

20 Claims, 3 Drawing Sheets

US 8,231,716 B2

SELF-ALARMING AIR CLEANER

RELATED APPLICATION

This application is the US national phase of International Application Number PCT/CN2008/000253, Filed on 31 Jan. 2008, which designated the U.S. and which claims benefit of CN 200720057431.7 filed 25 Sep. 2007, the entire content of which is hereby incorporated by reference.

BACKGROUND

The present invention relates to an air cleaner, and in particular to a self-alarming air cleaner.

As is well known, the air cleaner is used for purifying the air and normally is for indoor use or used in industrial equipments. The normal structure of air cleaner is as follows: an air inlet is provided on the casing of the air cleaner, and an air filter element is mounted in the air inlet, and when the air passes through the air inlet, the dust in the air is absorbed by the air filter element to purify the air. The purifying result may be affected due to the dust piled on the air filter element after longtime use, thus the air filter element should be replaced occasionally, and the user has to check the condition of air cleaner ever and again, which is very inconvenient.

SUMMARY OF THE INVENTION

Having outlined the state of the prior art and its attendant shortages, it is an object of the present invention to provide a self-alarming air cleaner, which overcomes the shortages in prior art, and when it is necessary to replace the air filter element, it will automatically give an alarm to the user.

The above object of the present invention is achieved by the following technical solutions:

A self-alarming air cleaner comprises an air filter element, a light emitting element, and a light sensor. The light emitting element and the light sensor both face to the air filter element. The light emitted from the light emitting element is reflected or transmitted by the air filter element to form an area of light attenuation where the light sensor is located. The light emitting element and the light sensor are connected with a circuit having an alarming device.

In the invention, the light emitted by the light emitting element irradiates on the air filter element, and after the air filter element is used for a long time, a large amount of dust will be absorbed on the surface of the air filter element to build up the small through holes of the air filter element, which results in a reduction of the intensity of transmitted or reflected light. After the light reflected or transmitted by the air filter element is received by the light sensor, the alarm device will give an alarm to the user to replace the air filter element in time if the light intensity is too low.

Preferably, the light emitting element and the light sensor are arranged respectively on the two sides of the air filter element, that is to say, the light sensor is located at the transmission area formed by the light of the light emitting element after being transmitted by the air filter element.

Alternatively, the light emitting element and the light sensor are arranged respectively on the two sides of the air filter element, that is to say, the light sensor is located at the reflection area formed by the light of the light emitting element after being reflected by the air filter element.

Preferably, the circuit comprises a power supply C1 finally connected to the light emitting element and the light sensor, and a regulating resistor R1 connected to the light sensor. The regulating resistor R1 is used for adjusting the alarm limit value of the alarming device to adjust the limit value of dust on the air filter element when alarming.

Preferably, the alarming device is a LED. When it is necessary to replace the air filter element, the LED flashes to remind the user to replace it.

Preferably, an anion generator is provided in the air cleaner. The anion generator can produce anions for sterilization and deodorization, which improves the purifying results.

1. air filter element;
2. light emitting element;
3. light sensor;
4. alarming device;
5. motor;
6. anion generator;
7. casing;
8. wind wheel.

DETAILED DESCRIPTION OF THE PREFERRED EMBODIMENT

Many aspects of the invention can be better understood in the following embodiments with reference to the accompanying drawings.

Figure 1:
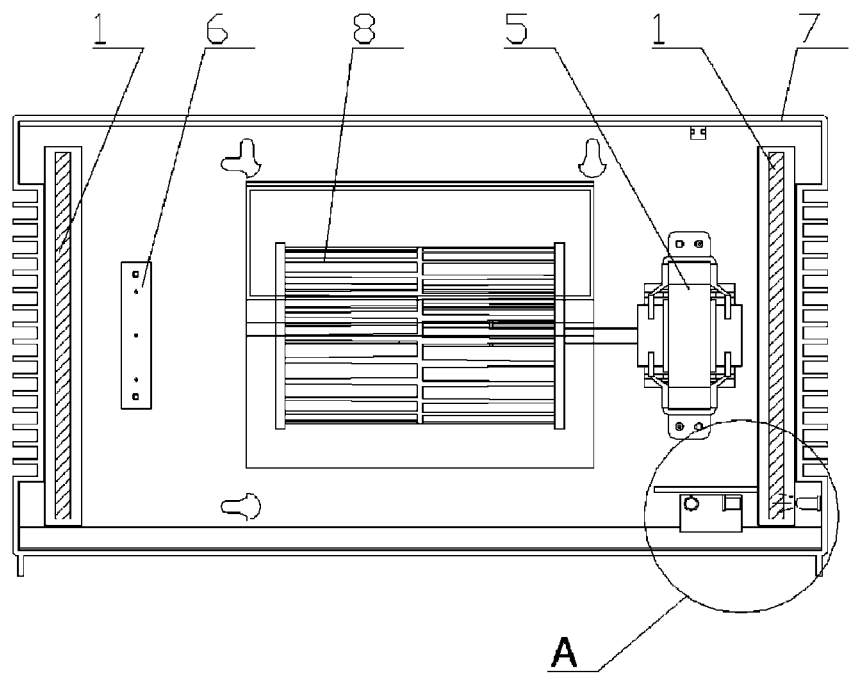
FIG. 1 is a schematic sectional view of a first embodiment of the invention.
Figure 2:
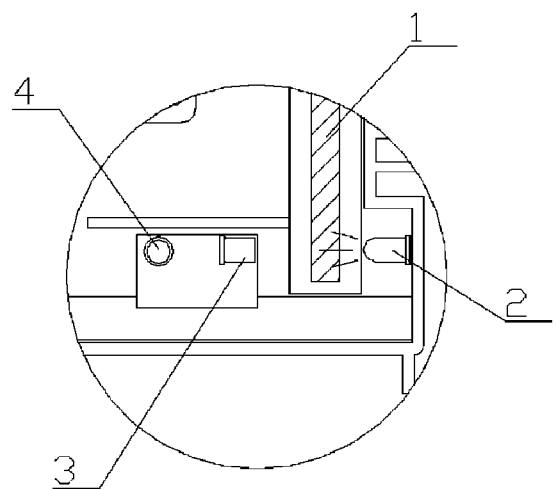
FIG. 2 is a detailed view of the A section shown in FIG. 1.
Figure 3:
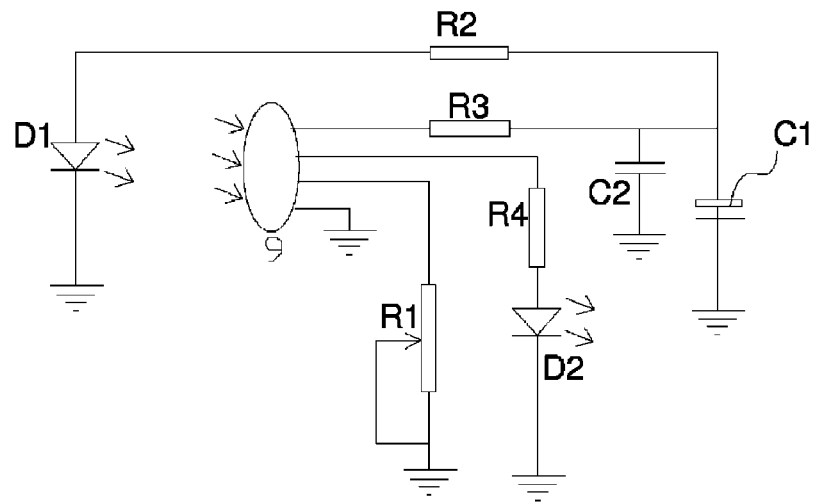
FIG. 3 is a circuit diagram of a first embodiment of the invention.

Referring to FIG. 1 to FIG. 3, an air cleaner includes an air filter element 1, a light sensor 3, and a light emitting element 2 such as a LED, a light tube, a light bulb, an infrared or laser. The light emitting element 2 and the light sensor 3 both face to the air filter element 1. The light emitted from the light emitting element 2 is reflected or transmitted by the air filter element 1 to form an area of light attenuation where the light sensor 3 is located. The light emitting element 2 and the light sensor 3 are connected with a circuit having an alarming device 4.

The air filter element 1 is mounted at the air inlet of the casing 7. A wind wheel 8 and a motor 5 are mounted inside the casing 7. An anion generator 6 is provided in the air cleaner. The light emitting element 2 and the light sensor 3 are arranged respectively on the two sides of the air filter element 1, that is to say, the light sensor 3 is located at the transmission area formed by the light of the light emitting element 2 after being transmitted by the air filter element 1. The alarming device 4 is a second light emitting element such as a LED. The circuit comprises a power supply C1 finally connected to the light emitting element 2 and the light sensor 3, and a regulating resistor R1 connected to the light sensor 3.

When in use, the wind wheel 8 is driven to rotate by the motor 5 to enable the air to pass through the air cleaner. The anion generator 6 produces anions to improve the air purifying result. When passing through the air filter element 1, the dust adheres on the air filter element 1, and the light emitted by the light emitting element is shaded by the air filter element 1 when the dust reaches a certain amount, and the light sensor 3 makes the LED flash to give an alarm after the dust amount reaches a certain degree, which is very convenient compared with the prior art.

Embodiment 2

Figure 4:
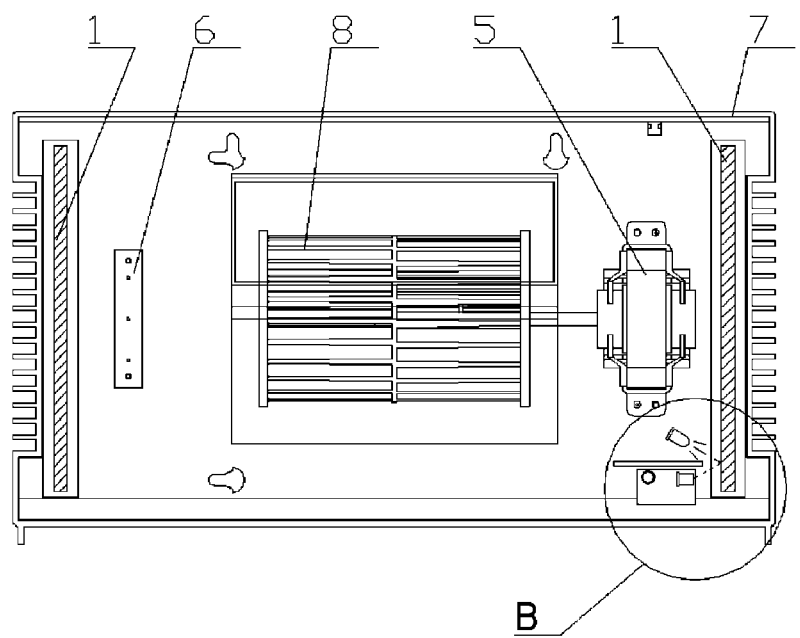
FIG. 4 is a schematic sectional view of a second embodiment of the invention.
Figure 5:
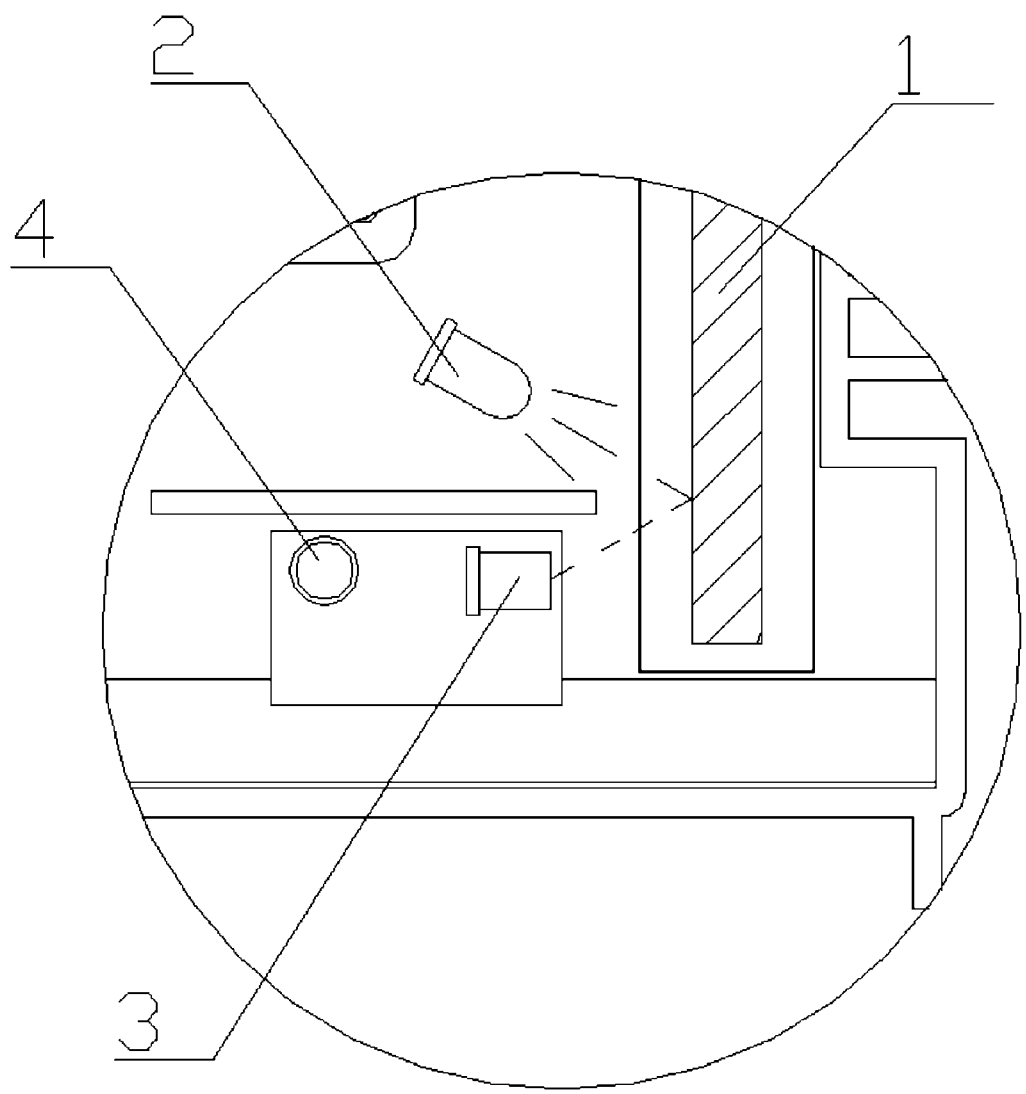
FIG. 5 is a detailed view of the B section shown in FIG. 4; and the following is a list of the item numbers and items identified in the drawings.

Referring to FIG. 4 and FIG. 5, the distinct features of the embodiment 2 with respect to the embodiment 1 lie in that the light emitting element 2 and the light sensor 3 are located on the same side of the air filter element 1, that is to say, the light sensor 3 is located at the reflection area formed by the light of the light emitting element 2 after being reflected by the air filter element 1. In this embodiment, after a large amount of dust is piled on the air filter element 1, the intensity of the light of light emitting element reflected by the air filter element 1 is weakened, and the LED flashes to give an alarm, the principle of which is similar to the embodiment 1.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

What is claimed is:

1. An air cleaner comprising:
    an air filter element;
    a light emitting element emitting light at the air filter element, the light emitted from the light emitting element being reflected or transmitted by the air filter element to form an area of light attenuation;
    a light sensor sensing a level within the area of light attenuation; and
    an electric circuit having an alarming device and connected with the light sensor, the circuit enabling the alarming device upon sensing of a predetermined light level within the area of light attenuation by the light sensor.

2. The air cleaner of claim 1, wherein the light emitting element and the light sensor are arranged on opposing of an intake side and an exhaust side of the air filter element, the light sensor being located within the transmission area formed by the light of emitted from the light emitting element after being transmitted through the air filter element.

3. The air cleaner of claim 1, wherein the light emitting element and the light sensor are located on the same of an intake side and an exhaust side of the air filter element, the light sensor being located within the reflection area formed by the light emitted from the light emitting element after being reflected by the air filter element.

4. The air cleaner of claim 2, wherein the circuit comprises a power supply connected to the light emitting element and the light sensor, and a regulating resistor connected to the light sensor.

5. The air cleaner of claim 2, wherein the alarming device is a LED.

6. The air cleaner of claim 2, further comprising an anion generator.

7. The air cleaner of claim 3, wherein the circuit comprises a power supply connected to the light emitting element and the light sensor, and a regulating resistor connected to the light sensor.

8. The air cleaner of claim 3, wherein the alarming device is a LED.

9. The air cleaner of claim 3, further comprising an anion generator.

10. An air filter having a non-dusty condition and a dusty condition, wherein when disposed within the air cleaner of claim 1, the light emitted from the light emitting element and reflected or transmitted by the air filter element is above the predetermined light level within the area of light attenuation when the air filter is in the non-dusty condition, and the light emitted from the light emitting element and reflected or transmitted by the air filter element is at or below the predetermined light level within the area of light attenuation when the air filter is in the dusty condition.

11. The air filter of claim 10, wherein when disposed within the air cleaner of claim 2, the light emitted from the light emitting element and transmitted by the air filter element is above the predetermined light level within the area of light attenuation when the air filter is in the non-dusty condition, and the light emitted from the light emitting element and transmitted by the air filter element is at or below the predetermined light level within the area of light attenuation when the air filter is in the dusty condition.

12. The air filter of claim 10, wherein when disposed within the air cleaner of claim 3, the light emitted from the light emitting element and reflected by the air filter element is above the predetermined light level within the area of light attenuation when the air filter is in the non-dusty condition, and the light emitted from the light emitting element and reflected by the air filter element is at or below the predetermined light level within the area of light attenuation when the air filter is in the dusty condition.

13. In combination, a first light emitter, an air filter, a light sensing circuit, and a second light emitter; wherein
    said light sensing circuit is arranged to sense light emitted from said first light emitter and reflected off or transmitted through said air filter;
    said light sensing circuit is arranged to distinguish between a non-dusty light level and a dusty light level;
    said light sensing circuit is arranged to enable said second light emitter only when said dusty light level is sensed; and
    said filter is arranged to reflect or transmit light emitted from said first light emitter at said non-dusty light level when said filter is non-dusty, and to reflect or transmit light emitted from said first light emitter at said dusty light level when said filter is dusty.

14. The combination of claim 13; wherein
    said light sensing circuit is arranged to sense light emitted from said first light emitter and transmitted through said air filter;
    said light sensing circuit is arranged to distinguish between a non-dusty light level and a dusty light level;
    said light sensing circuit is arranged to enable said second light emitter only when said dusty light level is sensed; and
    said filter is arranged to transmit light emitted from said first light emitter at said non-dusty light level when said filter is non-dusty, and to transmit light emitted from said first light emitter at said dusty light level when said filter is dusty.

15. The combination of claim 13; wherein
    said light sensing circuit is arranged to sense light emitted from said first light emitter and reflected off said air filter;
    said light sensing circuit is arranged to distinguish between a non-dusty light level and a dusty light level;
    said light sensing circuit is arranged to enable said second light emitter only when said dusty light level is sensed; and said filter is arranged to reflect light emitted from said first light emitter at said non-dusty light level when said filter is non-dusty, and to reflect light emitted from said first light emitter at said dusty light level when said filter is dusty.

16. The combination of claim 13 further comprising an air cleaning apparatus, said apparatus containing the combination and configured to draw dusty air into said filter to convert said filter from non-dusty to dusty.

17. The combination of claim 16 wherein said second light emitter is externally disposed on said air cleaning apparatus.

18. The combination of claim 17 wherein said apparatus further comprises a blower for drawing said dusty air into said filter.

19. The combination of claim 18 wherein said apparatus further comprises an anion generator arranged to ionize air exhausted by said blower.

20. And air cleaning apparatus comprising:
a housing;
an air filter disposed within said housing;
a motorized blower disposed within said housing and arranged to draw dusty air into said air filter where the dusty air is converted to non-dusty air, and to exhaust said non-dusty air from said housing;
a first light emitter disposed adjacent said air filter and arranged to emit light there-at;
a light sensor disposed adjacent said air filter and arranged to sense said emitted light after reflection thereof off or transmission thereof through said filter;
an electric circuit connected to said light sensor and adapted to distinguish between a non-dusty light level sensed by said light sensor and a dusty light level sensed by said light sensor,
a second light emitter connected to said electric circuit and enabled thereby only when said circuit distinguishes a dusty light level; wherein
said air filter is adapted to reflect or transmit light from said first light emitter at said non-dusty light level when said filter is non-dusty and to reflect or transmit light from said first light emitter at or below said dusty light level when said filter is dusty.

* * * * *